(12) United States Patent
De Schrijver (10) Patent No.: US 10,437,802 B2
(45) Date of Patent: Oct. 8, 2019

(54) SINGLE IO OPERATION INTEGER-VALUE DATABASE

(71) Applicant: Western Digital Technologies, Inc., San Jose, CA (US)

(72) Inventor: Frederik Jacqueline Luc De Schrijver, Wenduine (BE)

(73) Assignee: Western Digital Technologies, Inc., San Jose, CA (US)

( * ) Notice: Subject to any disclaimer, the term of this patent is extended or adjusted under 35 U.S.C. 154(b) by 395 days.

(21) Appl. No.: 15/063,253

(22) Filed: Mar. 7, 2016

(65) Prior Publication Data

US 2017/0255657 A1  Sep. 7, 2017

(51) Int. Cl.
  G06F 17/30   (2006.01)
  G06F 16/22   (2019.01)
  G06F 16/23   (2019.01)

(52) U.S. Cl.
  CPC ...... *G06F 16/2228* (2019.01); *G06F 16/2379* (2019.01)

(58) Field of Classification Search
  CPC .................................................. G06F 17/30
  See application file for complete search history.

(56) References Cited

U.S. PATENT DOCUMENTS

| | | | | |
|---|---|---|---|---|
| 6,067,540 | A * | 5/2000 | Ozbutun | ........... G06F 17/30324 |
| 2006/0143238 | A1* | 6/2006 | Tamatsu | ............ G06F 17/30336 |
| 2009/0063523 | A1* | 3/2009 | Goyal | ............... G06F 17/30595 |
| 2012/0036317 | A1* | 2/2012 | Torii | .................. G06F 17/30982 711/108 |
| 2012/0102298 | A1* | 4/2012 | Sengupta | .......... G06F 17/30949 711/216 |
| 2013/0339366 | A1* | 12/2013 | Khimich | ........... G06F 17/30587 707/741 |

OTHER PUBLICATIONS

Zhang, Yiying et al.; De-indirection for Flash-based SSDs with Nameless Writes; dated 2012; 16 pages; Computer Sciences Department, University of Wisconsin-Madison.

* cited by examiner

*Primary Examiner* — Hung Q Pham
(74) *Attorney, Agent, or Firm* — Patent Law Works LLP (57) ABSTRACT

The present disclosure relates to a system and methods of implementing an integer-value database using a single I/O operation. In particular, the present disclosure relates to methods of writing and reading information to a database using key/value pairs, including receiving, at a database management system, a value to be written to a database, the database including a plurality of segments stored on a storage medium, and assigning, by the database management system, an assigned key to the value based on keys previously used in the database. The method may further include storing, by the database management system, the assigned key and the value to a segment at a virtual end of the database, wherein the segment is identified in a mapping index by an offset and the mapping index identifies a first key in the segment, and returning the assigned key.

16 Claims, 5 Drawing Sheets

SINGLE IO OPERATION INTEGER-VALUE DATABASE

FIELD OF THE INVENTION

The present disclosure relates to a system and methods of controlling a storage system. In particular, the present disclosure relates to methods of implementing an integer-value database using a single I/O operation.

BACKGROUND

As large amounts of data are stored, the number of input/output operations with which information may be written to and retrieved from storage media is increasingly important. In some instances, databases are so large that they are too expensive or difficult to store on main operating memory, so the databases may be stored on secondary storage, such as a hard disk drive. The way in which data is written to and retrieved from these secondary storage significantly affects the speed with which information may be written and retrieved from the database. In some instances, it may be useful to store information in a database using key/values pairs.

Thus, to increase the speed of storage and retrieval of information, especially using key/value type storage, there is a need to reduce the number of input/output operations required to store or retrieve a value.

SUMMARY

Systems and methods for implementing a key/value database using a single I/O operation are disclosed. The systems and methods introduced herein increase the speed with which data may be written to or retrieved from a secondary storage medium, for example, a storage medium other than RAM operating memory. For example, in some implementations, a system includes one or more processors and a memory storing instructions that cause the one or more processors to receive, at a database management system, a value to be written to a database, the database including a plurality of segments stored on a storage medium; assign, by the database management system, an assigned key to the value based on keys previously used in the database; store, by the database management system, the assigned key and the value to a segment at a virtual end of the database, wherein the segment is identified in a mapping index by an offset and the mapping index identifies a first key in the segment; and return, by the database management system, the assigned key.

In some implementations, the system includes one or more processors and a memory storing instructions that cause the one or more processors to receive, at a database management system, a read request including a key; determine, at the database management system, a segment corresponding to the key based on an index; locate, at the database management system, the segment in the database; locate, at the database management system, the key in the segment; return, at the database management system, a value associated with the key.

These and other implementations may optionally include one or more of the following features, such as: determining, by the database management system, that a segment directly preceding the new segment does not have enough remaining storage space to store the assigned key and the value, and creating, by the database management system, a new segment in the database, wherein the new segment is the segment at the virtual end of the database to which the assigned key and value are stored; filling, by the database management system, a remaining portion of the new segment with logical 0s; updating, by the database management system, the mapping index to include the assigned key as the first key in the segment and the offset identifying the new segment; that the assigned key and the keys previously used in the database are stored in sequential order in the storage medium; that the storage medium includes a hard disk drive; storing, by the database management system, the segment and the assigned key in memory; syncing, by the database management system, the segment in memory to the storage medium based on an event; that assigning an assigned key to the value based on keys previously used in the database and storing the assigned key and the value to a segment at a virtual end of the database are performed by the database management system in a single input/output operation on the storage medium; that the index includes a mapping of segments to segment offsets and first keys stored in the segments; scanning the index to identify a first segment that has a first key that is higher than a requested key; and selecting the segment based on identifying the first segment, the segment preceding the first segment that has the first key that is higher than the requested key; and identifying an offset of the segment using the index and reading the segment at a location of the database corresponding to the offset.

Other implementations of one or more of these aspects include corresponding systems, apparatus, methods, and computer programs, configured to perform the actions of the methods, encoded on computer storage devices. It should be understood that the language used in the present disclosure has been principally selected for readability and instructional purposes, and not to limit the scope of the subject matter disclosed herein.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

Systems and methods for implementing an integer-value database using a single I/O operation are disclosed. While the systems and methods of the present disclosure are described in the context of a particular system architecture, it should be understood that the systems and methods can be applied to other architectures and organizations of hardware.

The techniques described herein improve speed when using a key/value type storage database stored on a storage device, such as a hard drive disk, when the entire database is too large to fit into main operating memory. For example, reading and writing information in scattered locations or using multiple input/output operations may be substantially slower than sequentially reading and writing information on a spinning storage medium, such as a hard disk drive. The techniques described herein solve these problems by enabling a key/value type database to be written to a storage device, such as a hard disk drive, in a sequential order and using, on average, a single input/output operation per data entry (e.g., value storage or retrieval).

Some of the techniques described herein are implemented on an Ext4 file system, but they may be implemented using direct block commands to a storage device. The file system overhead should be minimized for improved performance.

Figure 1:
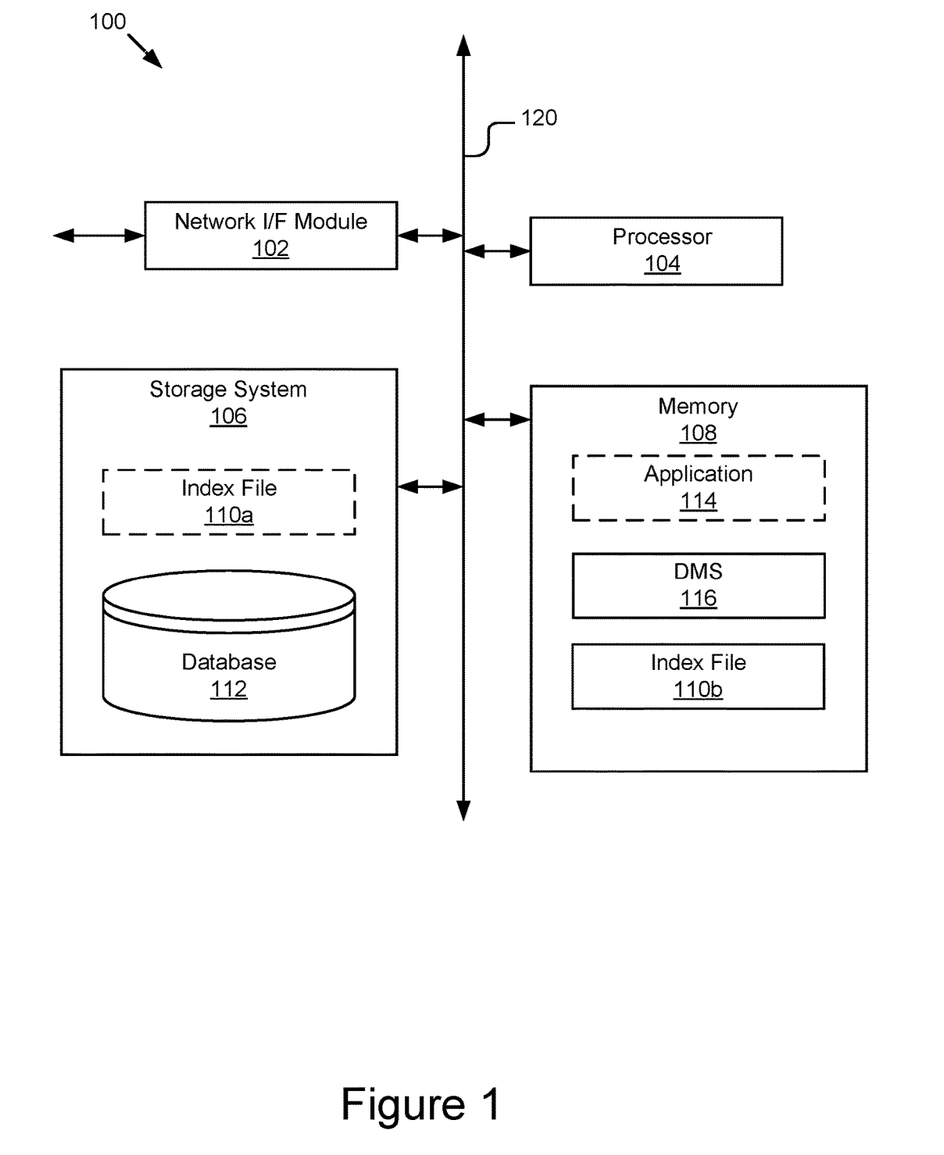
FIG. 1 is a block diagram illustrating an example system configured to implement an integer-value database using a single I/O operation.

FIG. 1 is a block diagram illustrating an example system 100 configured to implement the techniques introduced herein. In one implementation, the system 100 is a client device 112. In other implementations, the system 100 is a storage controller. In yet further implementations, the system 100 may be implemented as a combination of a client device and storage controller. The system 100 can be any computing device including one or more memory and one or more processors, for example, any electronic device capable of making storage requests (e.g., read, write, etc.). The system 100 may execute an application 114 that makes storage requests to the storage system 106.

The system 100 may include a network interface (I/F) module 102, a processor 104, a storage system 106, and a memory 108. The components of the system 100 are communicatively coupled to a bus or software communication mechanism 120 for communication with each other.

In some implementations, software communication mechanism 120 may be an object bus (e.g., CORBA), direct socket communication (e.g., TCP/IP sockets) among software modules, remote procedure calls, UDP broadcasts and receipts, HTTP connections, function or procedure calls, etc. Further, any or all of the communication could be secure (SSH, HTTPS, etc.). The software communication mechanism 120 can be implemented on any underlying hardware, for example, a network, the Internet, a bus, a combination thereof, etc.

The network interface (I/F) module 102 is configured to connect system 100 to a network and/or other system. For example, network interface module 102 may enable communication through one or more of the internet, cable networks, and wired networks. The network interface module 102 links the processor 104 to a network that may in turn be coupled to other processing systems. The network interface module 102 also provides other conventional connections to devices on a network for distribution and/or retrieval of files and/or media objects using standard network protocols such as TCP/IP, HTTP, HTTPS and SMTP as will be understood. In some implementations, the network interface module 102 includes a transceiver for sending and receiving signals using Wi-Fi, Bluetooth®, or cellular communications for wireless communication.

The network interface module 102 may allow other client devices to store data to and retrieve data from the storage system 106, for example, across a network. For example, the network interface module 102 may allow one or more components of the system 100 to act as network accessed storage or as an array of storage devices.

The network can be one of a conventional type, wired or wireless, and may have numerous different configurations including a star configuration, token ring configuration, or other configurations. Furthermore, the network may include a local area network (LAN), a wide area network (WAN) (e.g., the internet), and/or other interconnected data paths across which multiple devices may communicate. In some implementations, the network may be a peer-to-peer network. The network may also be coupled with or include portions of a telecommunications network for sending data using a variety of different communication protocols. In some implementations, the network may include Bluetooth (or Bluetooth low energy) communication networks or a cellular communications network for sending and receiving data including via short messaging service (SMS), multimedia messaging service (MMS), hypertext transfer protocol (HTTP), direct data connection, WAP, email, etc.

The processor 104 may include an arithmetic logic unit, a microprocessor, a general purpose controller or some other processor array to perform computations and provide electronic display signals to a display device. In some implementations, the processor 104 is a hardware processor having one or more processing cores. The processor 104 is coupled to the bus 120 for communication with the other components of system 100. Processor 104 processes data signals and may include various computing architectures including a complex instruction set computer (CISC) architecture, a reduced instruction set computer (RISC) architecture, or an architecture implementing a combination of instruction sets. Although only a single processor is shown in the example of FIG. 1, multiple processors and/or processing cores may be included. It should be understood that other processor configurations are possible.

The storage system 106 is a data storage system that may store information on any type of attached array of writable storage media, such as magnetic disk or tape, optical disk, flash memory, solid-state drive (SSD), electronic random access memory (RAM), micro-electro mechanical and/or any other similar media adapted to store information, including data and parity information. However, as illustratively described herein, the information is stored on disks of hard disk drives (HDD). The storage device(s) of the storage system 106 may be included in one or more enclosures housed in the same location or physically distributed to disparate locations across a storage area network.

In some implementations, the storage system 106 includes a storage interface (I/F) module (not shown) that cooperates with database management system 116 to access information requested by a user, the application 114, a client device, a storage controller, etc. The storage I/F module includes a plurality of ports having input/output (I/O) interface circuitry that couples with the writeable storage media over an I/O interconnect arrangement.

In some implementations, the storage system 106 may include an index file 110a that may be accessed by the database management system 116. The index file 110a contains a mapping index that maps the locations or offsets (e.g., a location in reference to a second location) of segments of a database to keys stored in those segments. In some implementations, the index file 110b is additionally or alternatively stored in memory 108 and synced between the memory 108 and the storage system 106. The index file 110 (index files 110a and 110b may be referred to as 110 for simplicity) and mapping index are described in further detail elsewhere herein.

A segment may comprise a division of storage in writeable storage media. In some implementations, a segment comprises a defined amount of data storage capacity. In some implementations, a segment comprises a disk sector. A disk sector may be a division of a hard disk drive storing a fixed amount of accessible data (e.g., 512 bytes, 2048 bytes, 4096 bytes, etc.) at a particular location or offset of the disk. In some implementations, a segment comprises multiple disk sectors or may be a portion of a disk sector. In some implementations, the size of the key and value is much smaller than a segment size of a storage device used in a storage system 106.

The storage system 106 includes a database 112 in which data is stored in one or more values, for example, the database 112 may be sequentially written to segments using a sequential assignment of keys.

The memory 108 stores instructions and/or data that may be executed by the processor 104. The memory 108 is coupled to the bus 120 for communication with the other components of the system 100. The instructions and/or data stored in the memory 108 may include code for performing any of the techniques described herein. The memory 108 may be, for example, non-transitory memory such as a dynamic random access memory (DRAM) device, a static random access memory (SRAM) device, non-volatile (e.g., flash) memory or some other memory devices.

In some implementations, an application 114 is stored on memory 108 and configured to be executed by the processor 104. The application 114 may be a set of instructions or computer logic that performs operations on the system 100. The application 114 may communicate with the database management system 116 to store and retrieve data to the storage system 106. In some instances, the application 114 may include a file management system that may communicate with the database management system 116. In some instances, the application 114 may send a value to the database management system 116 for storage and, in response, may receive an assigned key corresponding to the storage of that value from the database management system 116.

The database management system 116, stored on memory 108 and configured to be executed by processor 104, facilitates the storage and retrieval of data stored on the storage system 106. In some implementations, the database management system 116 is configured to write data to the storage system 106 in a single input/output operation using the techniques described herein. The database management system 116 may store data sequentially in the database 112. For example, the database management system 116 may store keys in increasing order in the database 112.

In some implementations, the memory 108 also stores and provides access to an index file 110b that includes the mapping index as described above. In some instances, the index file 110b may be stored in both the memory 108 and storage system 106; however in such instances, the index file 110b stored in the memory 108 may be updated differently than the index file 110a stored in the storage system 106. For example, at initialization of the storage system 106, the index file 110a may be read from the storage system 106 into the memory 108, after which point, the index file 110b in memory may be updated at different times than the index file 110a in the storage system 106. For example, the database management system 116 may store updates to the index file 110b in the memory 108 and then may periodically, or in response to an event (e.g., closing the storage system 106), sync the index file 110b to the index file 110a in the storage system 106.

Figure 2:
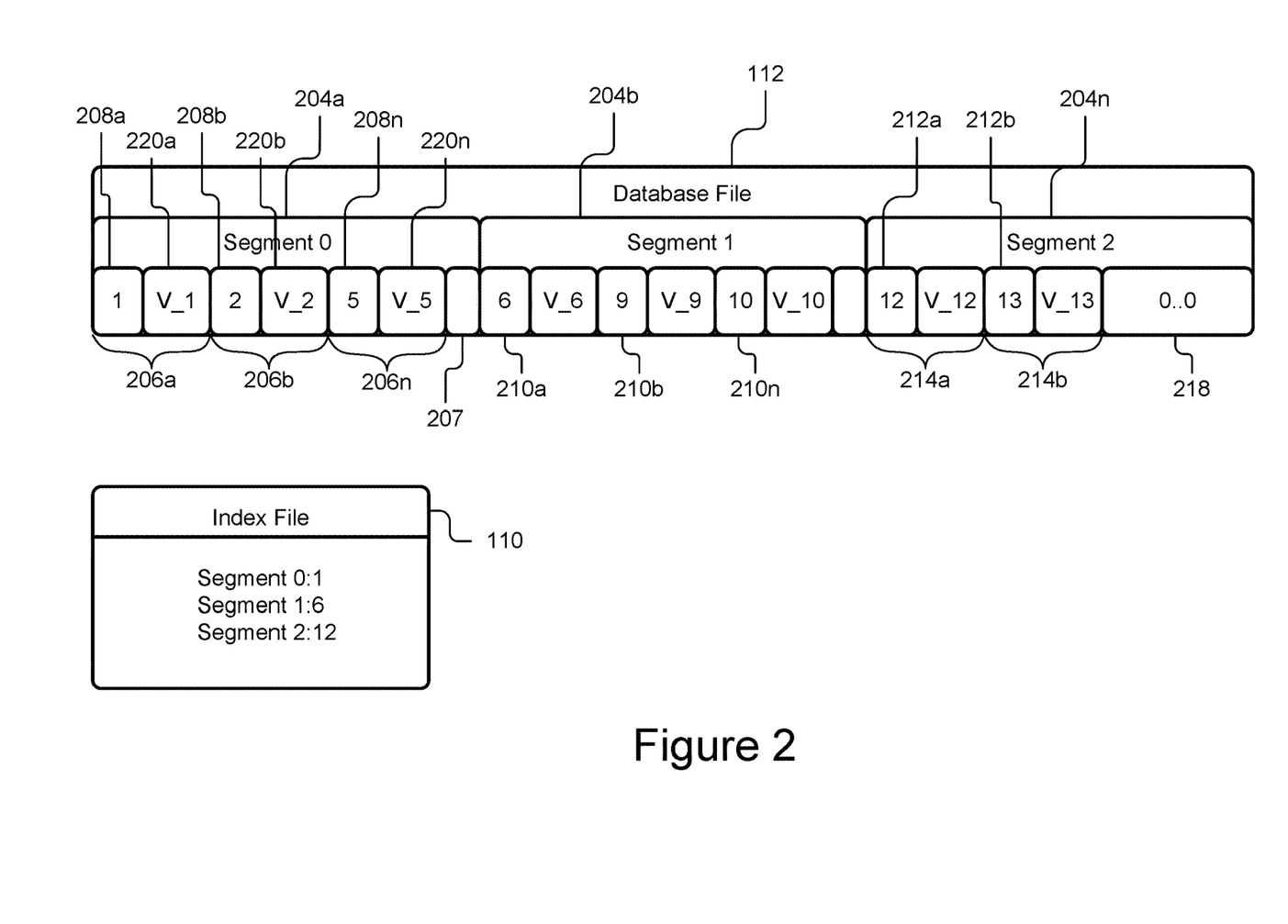
FIG. 2 is a block diagram illustrating an example of keys and values stored in a database file and a corresponding mapping index stored in an index file.
Figure 3:
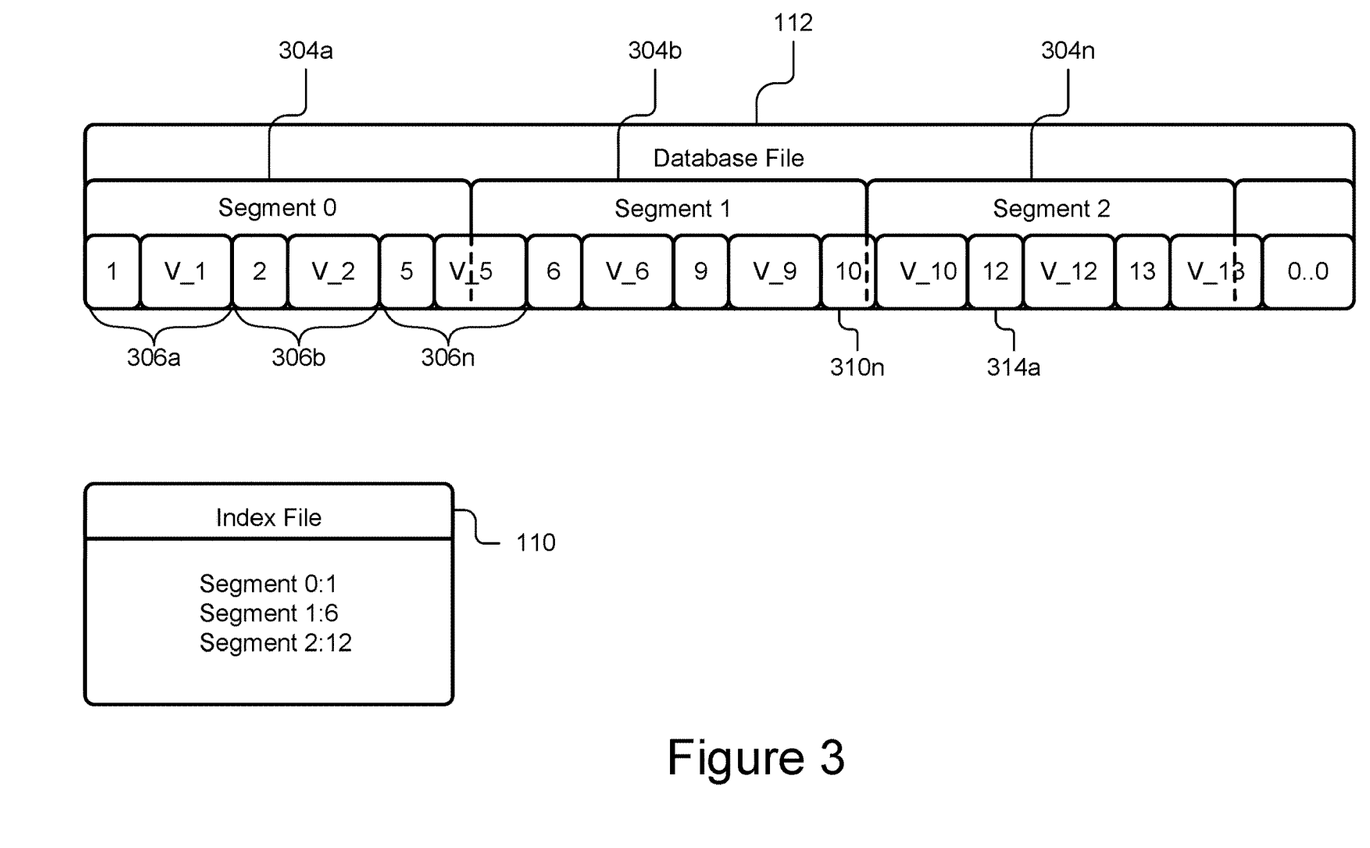
FIG. 3 is a block diagram illustrating another example of keys and values stored in a database file and a corresponding mapping index stored in an index file.

FIG. 2 is a block diagram illustrating an example of keys and values stored in a database file and a corresponding mapping index stored in an index file. In the example of FIG. 2, the primary structure for the database 112 is a sequence of segments 204a-204n stored on a storage medium. Each segment consists of a sequence of segment entries 206a-206n. An entry comprises a key/value pair. In order to reduce unused space at the end of a segment, the writable size (e.g., the data portion of a disk sector, exclusive of the header, etc.) of a segment should be a multiple or as close as possible to a multiple of the size of each entry 206a-206n, although other implementations are possible, for example, some entries may be stored in multiple segments, as illustrated in FIG. 3. Thus, the number of key/value pairs that may be stored in a segment may be fixed, because the segment size is fixed and the size of the key/value pairs are fixed. In other embodiments, the size of a key/value pair may vary (e.g., based on the amount of data to be stored) and therefore, the number of key/value pairs that may be stored in a segment may vary.

The entries 206a-206n are stored in the database file 112 in increasing order according to the values of the keys. For example, keys 208a, 208b, and 208n in segment 204a are 1, 2, and 5, respectively. Keys 210a, 210b, and 210c in segment 204b are 6, 9, and 10, respectively. In the illustrated example, keys are stored in each segment in increasing order. Similarly, segments 204a-204n are also in increasing order according to keys. For example, the first key 208a in segment 204a is 1, the first key 210a in segment 204b is 6, and the first key 212a in segment 204n is 12.

In the example of FIG. 2, the entries 206a-206n do not fill the entirety of the storage space in segment 204a, so segment 204a includes an amount of unused remaining storage space 207 that is smaller than the space used for key/value pair entry.

A key is a reference by which a value may be stored or retrieved in a database file 112. A key may be a 64 bit unsigned integer, although other implementations are possible. In some implementations of the techniques described herein, a key is a binary number greater than 0, so that 0 is seen by the database management system 116 as a special value. For example, a special value of 0 may indicate that that storage space is blank.

If parts of a segment do not contain any entries, the database management system 116 may fill the remaining storage space with logical 0s. For example, segment 204n includes entries 214a and 214b, but the remainder 218 of the segment is empty, so it is filled with logical 0s.

Values are sequentially written to the database 112 corresponding to each key. In the example of FIG. 2, value V_1 corresponds to key 1, as illustrated by key 206a and value 220a; value V_2 corresponds to key 2, as illustrated by key 206b and value 220b; and value V_5 corresponds to key 5, as illustrated by key 206n and value 220n.

A value is data that is to be stored to a database file 112. In some implementations, a value is a fixed size integer. In some implementations, a value is 24 bytes, although other sizes are possible. For example, if segments in the database 112 are sized at 4096 bytes, then 128 key/value pairs consisting of 8 byte keys and 24 byte values are possible.

In some implementations, the database management system 116 may not be capable of deleting individual entries from the database. The database management system 116 may mark keys as deleted or expired, but the key/value pair is not actually removed from the database, nor is the mapping index changed.

In some implementations, in order to delete entries from the database file itself, a database may be to exclude those entries that are no longer needed (e.g., those with keys that are marked as deleted). For example, the database management system 116 may sequentially rewrite the database excluding those key/value pairs that are marked as deleted. FIG. 2 illustrates that keys remain in increasing order after the database 112 has been rewritten excluding deleted entries. Keys 208a, 208b, 208c, 210a, 210b, 210n, 212a, and 212b are 1, 2, 5, 6, 9, 10, 12, and 13, respectively. Keys 3, 4, and 11 were excluded from a rewrite of the database file 112 in order to reclaim usable space in the storage medium. Additionally, after the database is rewritten, the mapping index is updated.

The example of FIG. 2 includes an illustration of an index file 110. The index file 110 contains a mapping (e.g., a mapping index) of the segment offset to the first key that is present in that segment. In the example of FIG. 2, the index file 110 indicates that the segment with an offset of 0 (e.g., the first segment in the database) has a first key of 1, which is also indicated in the database file 112 (segment 204a with offset of 0 has a first key 208a of 1). The index file 110 indicates that the segment with an offset of 1 has a first key of 6 and the segment with an offset of 2 has a first key of 12.

FIG. 3 is a block diagram illustrating another example implementation of keys and values stored in a database file 112 and a corresponding mapping index stored in an index file 110. In the example of FIG. 3, the database management system 116 is configured to store entries in more than one segment. For example, entries 306a-306n are stored in segment 304a. In the example, entries 306a and 306b are stored entirely in the segment 304a, as in reference to FIG. 2, however segment 304a does not include enough remaining storage space to fit all of entry 306n. Accordingly, entry 306n may be stored in both segment 304a and the next segment 304b.

In instances where entries are stored in multiple segments, such as is illustrated in FIG. 3, the first whole key used in a segment is used to map the keys to segments in the mapping index. For example, although a portion of key 310n is stored in segment 304n, because the key 310n started in segment 304b, the first key in segment 304n is 314a.

In implementations, such as is illustrated in FIG. 3, additional information may be stored in the index file 110, such as the last key stored in each segment.

Figure 4:
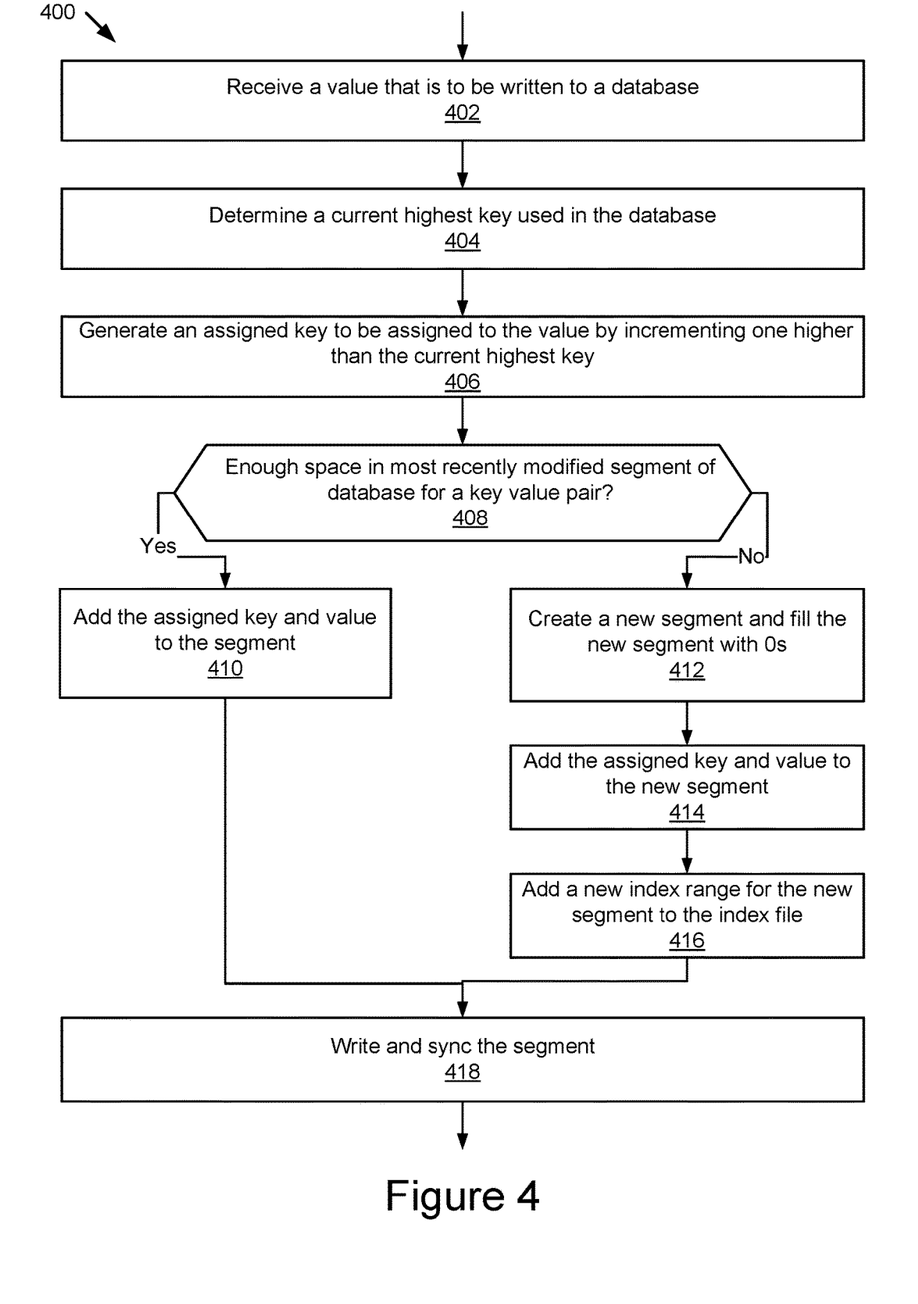
FIG. 4 is a flowchart of an example method for writing a value to the database according to the techniques described herein.

FIG. 4 is a flowchart of an example method 400 for writing a value to the database 112 according to the techniques described herein. In some implementations, the database management system 116 initiates the storage system 106 prior to writing data to the database 112. Initiation of the storage system 106 may include reading the entire index 110a from the storage system 106 into the memory 108. In some instances, because the index file 110a may not have been updated at a previous shut down, the database management system 116 may rebuild all or the last part of the mapping index in the index file 110a. For example the mapping index may be rebuilt by reading the segments and first keys in each segments at the end of the database 112. Garbage (e.g., index entries that do not match up with the database, data not expected by the system, etc.) at the end of the index file 110a may indicate that the index file should be rebuilt from the database as well as what parts of the mapping index should be rebuilt.

At 402, the database management system 116 receives a value that is to be written to the database. The database management system 116 may receive the value from a user, an application 114, etc. The key associated with the value is determined by the database management system 116 and not by a user or application 114. A user or application 114 may only add a value and receive an assigned key in return, unless the database management system 116 is operating in bulk add mode, as described below.

At 404, the database management system 116 determines the current highest key used in the database. The current highest key used is cached in the memory 108, so that the database management system 116 may more quickly determine and assign the next sequential key to the received value.

At 406, the database management system 116 generates an assigned key to be assigned to the value by selecting a key (e.g., by incrementing) one higher than the current highest key. The assignment of keys is incremental such that as an assigned key is added it is one higher than the current highest key used in the database 112 and memory 108 and larger than any other key present in the database 112.

At a point in the method 400 after the database management system 116 assigns the assigned key to the value (e.g., after 406), the database management system 116 may return the assigned key to the user or application 114 that requested storage of the value.

At 408, the database management system 116 determines whether there is enough space in the most recently modified segment of the database 112 to fit a key/value pair (e.g., as described in reference to FIG. 2). For example, in implementations where the key/value pair is 32 bytes, the database management system 116 determines whether there are 32 bytes of unused storage space (e.g., as indicated by the special value of all logical 0s, as discussed above) remaining at the end of the most recently modified segment. The most recently modified segment of the database 112 may be referred to as the segment at the virtual end of the database to indicate that the segment is at a changing end (e.g., the virtual end advances as new data is appended to the database 112) in a sequentially written database rather than the physical end of a storage medium. Additionally, in some implementations, the segment at the virtual end of the database 112 may be saved in the memory 108 so that it may be more quickly read and/or written to and then the entire segment may be synced to the database 112.

At 410, in response to a determination at 408 that enough space remains at the end of the most recently modified segment of the database, the database management system 116 adds (e.g., appends to the end) the assigned key and value to the most recently modified segment.

At 412, in response to a determination at 408 that there is not enough space remaining in the most recently modified segment of the database for the key/value pair, the database management system 116 creates (e.g., starts or begins to use) a new segment and fills the new segment with logical 0s (e.g., overwrite any data already on the storage device) and, at 414, adds the assigned key and value to the new segment. In some implementations, the database management system 116 fills the new segment with logical 0s and then writes the assigned key and value to the beginning of the new segment. In other implementations, the database management system 116 writes the assigned key and value to the beginning of the new segment and then fills the remainder of the new segment with logical 0s.

At 416, the database management system 116 adds a new index range for the new segment to the index file 110b in memory 108. In some implementations, the database management system 116 adds the new index range directly to index file 110a in the storage system 106. The new index range may include a segment offset or location and a beginning and/or ending key in the segment. For example, in the implementations depicted in FIGS. 2 and 3, the mapping index in the index file includes an offset of the segment and the first key in that segment.

At 418, the database management system 116 writes and syncs the segment from memory 108 to the database 112. In some implementations, the database management system 116 syncs the segment to the database 112 after each key/value pair write operation. In some implementations, the database management system 116 syncs the segment to the database 112 based on an event, such as the segment is full, a time period has elapsed, etc. It should be understood that multiple segments or portions of a segment may be written in memory 108 and then synced to the database 112 based upon any event or time period without departing from the scope of the techniques described herein.

In some implementations, the index file 110b is synced to the storage system 106 periodically or in response to some other event. For example, closing the storage system 106 cleanly may sync the mapping index in the index file 110b stored in memory 108 with the index file 110a stored on the storage system 106. The index file 110b may be synced to the storage system 106, so that if the storage system 106 is disconnected or powered down, the index file 110a may be used without being completely rebuilt from the database 112 each time the storage system 106 is initiated.

In some implementations, the database management system 116 includes a bulk add mode allowing the database to be created. In bulk add mode, the user or application 114 may add the assigned keys and corresponding values in increasing order according to the keys. The database management system 116 verifies that the order of the manually added keys are correct (e.g., increasing or sequential). The bulk add mode may be executed using the same path as in method 400, however, it may only write a segment when it is full. Additionally, the database management system 116 may sync the index file 110b to the storage system 106 when the bulk add is completed, rather than syncing the index file while key/value pairs are being added.

Figure 5:
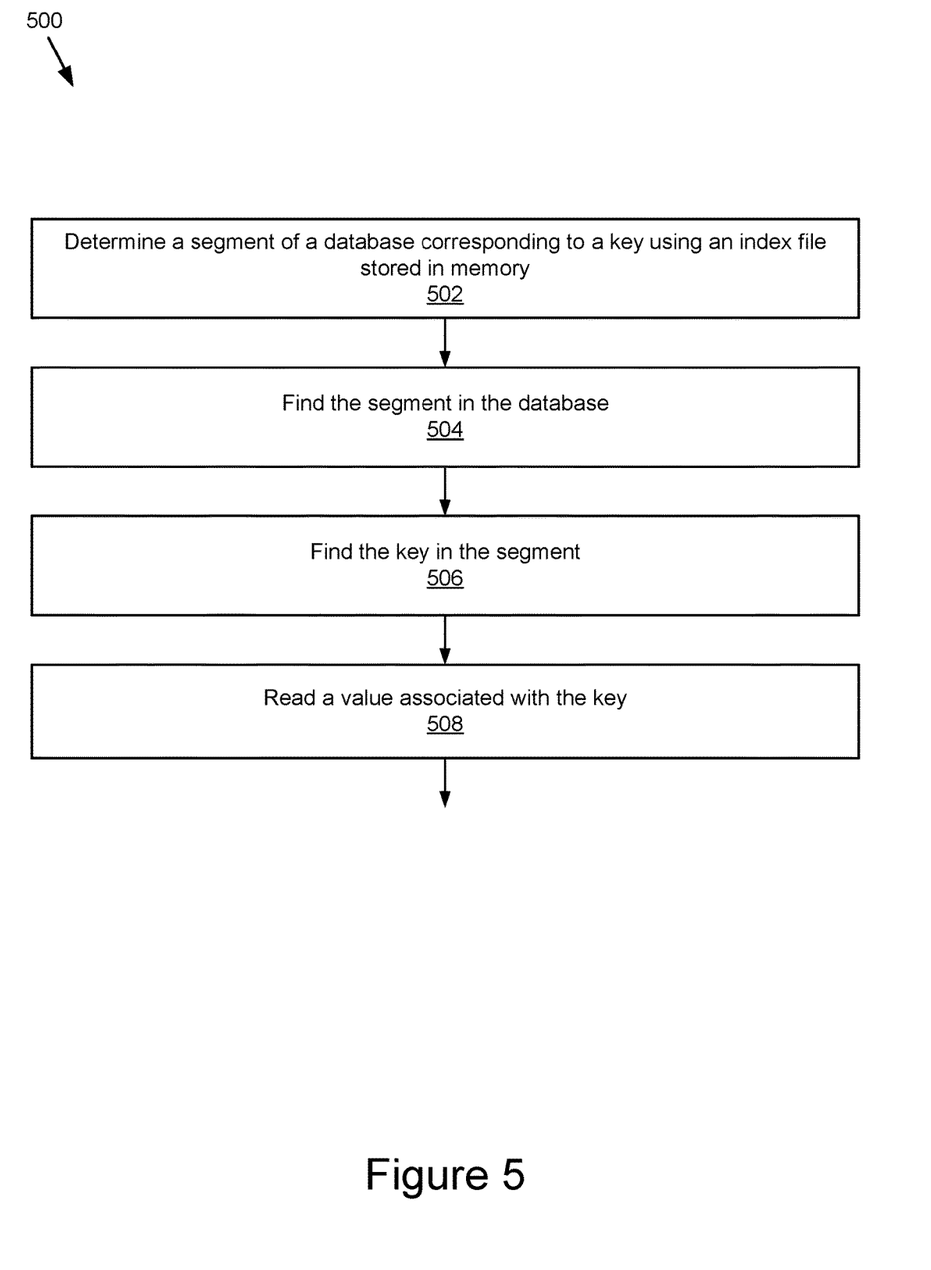
FIG. 5 is a flowchart of an example method for reading a value from the database according to the techniques described herein.

FIG. 5 is a flowchart of an example method 500 for reading a value from the database 112. The method 500 is designed to retrieve a value in a single TOP in response to a storage request (e.g., a read request). At 502, the database management system 116 determines a segment of the database 112 corresponding to a key using an index file 110b stored in memory 108. The database management system 116 may receive a storage request including a certain key from a user or application 114 to retrieve the value associated with the key. The database management system 116 looks up the key in the mapping index in the index file 110b including finding the segment with an index range that includes the key. For example, in some implementations, the database management system 116 may find the segment by scanning the index for the first segment that has a starting/indexed key that is higher than the key being searched for and then selecting the segment that precedes that segment with the higher key. The database management system 116 uses the mapping index to find the location or offset of the segment on the storage medium of the storage system 106.

At 504, the database management system 116 finds (e.g., locates) the segment in the database 112. For example, the database management system 116 may find the segment on a storage medium using an offset of the segment stored in the index file 110. In some implementations, the database management system 116 then reads the entire segment into memory 108.

At 506, the database management system 116 finds the key within the segment. In some implementations, in order to find the key, the database management system 116 reads the entire segment into memory 108 and then finds the key within the segment. In some implementations, the database management system 116 is capable of finding the key directly in the database 112.

At 508, the database management system 116 reads the value associated with the key and returns the value to the user or application 114 from which the read request was sent.

Systems and methods for implementing an integer-value database using a single I/O operation are described above. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above primarily in the context of on line services; however, the disclosed technologies apply to other data sources and other data types (e.g., collections of other resources for example images, audio, web pages).

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above may be presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description above. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method comprising:
    receiving, at a database management system, a value to be written to a database, the database including a plurality of segments stored on a storage medium;
    assigning, by the database management system, an assigned key to the value based on keys previously used in the database;
    storing, by the database management system, the assigned key and the value to a segment at a virtual end of the database, wherein:
        the virtual end of the database is located at a segment in the plurality of segments in the database that has been most recently modified,
        the segment is identified in a mapping index by an offset and the mapping index identifies a first key in the segment, and
        the assigning an assigned key to the value based on keys previously used in the database and the storing the assigned key and the value to a segment at a virtual end of the database are performed by the database management system in a single input/output operation on the storage medium; and
    returning, by the database management system, the assigned key.

2. The computer-implemented method of claim 1, wherein storing the assigned key and the value to the segment at the virtual end of the database includes:
    determining, by the database management system, that a segment directly preceding a new segment does not have enough remaining storage space to store the assigned key and the value; and
    creating, by the database management system, the new segment in the database, wherein the new segment is the segment at the virtual end of the database to which the assigned key and value are stored.

3. The computer-implemented method of claim 2, further comprising:
    filling, by the database management system, a remaining portion of the new segment with logical 0s.

4. The computer-implemented method of claim 2, further comprising:
    updating, by the database management system, the mapping index to include the assigned key as the first key in the segment and the offset identifying the new segment.

5. The computer-implemented method of claim 1, wherein the assigned key and the keys previously used in the database are stored in increasing order in the storage medium.

6. The computer-implemented method of claim 1, wherein the storage medium includes a hard disk drive.

7. The computer-implemented method of claim 1, further comprising:
  storing, by the database management system, the segment and the assigned key in memory; and
  syncing, by the database management system, the segment in memory to the storage medium based on an event.

8. The computer-implemented method of claim 1, wherein the offset indicates a relative placement of the segment with respect to the plurality of segments in the database.

9. A system comprising:
  one or more processors; and
  a memory storing instructions that, when executed by the one or more processors, cause the system to:
    receive a value to be written to a database, the database including a plurality of segments stored on a storage medium;
    assign an assigned key to the value based on keys previously used in the database;
    store the assigned key and the value to a segment at a virtual end of the database, wherein:
      the virtual end of the database is located at a segment in the plurality of segments in the database that has been most recently modified,
      the segment is identified in a mapping index by an offset and the mapping index identifies a first key in the segment, and
      the assigning an assigned key to the value based on keys previously used in the database and the storing the assigned key and the value to a segment at a virtual end of the database are performed by a database management system in a single input/output operation on the storage medium; and
    return the assigned key.

10. The system of claim 9, wherein to store the assigned key and the value to the segment at the virtual end of the database the instructions cause the system to:
  determine that a segment directly preceding a new segment does not have enough remaining storage space to store the assigned key and the value; and
  create the new segment in the database, wherein the new segment is the segment at the virtual end of the database to which the assigned key and value are stored.

11. The system of claim 10, wherein the instructions cause the system to:
  fill a remaining portion of the new segment with logical 0s.

12. The system of claim 10, wherein the instructions cause the system to:
  update the mapping index to include the assigned key as the first key in the segment and the offset identifying the new segment.

13. The system of claim 9, wherein the assigned key and the keys previously used in the database are stored in increasing order in the storage medium.

14. The system of claim 9, wherein the storage medium includes a hard disk drive.

15. The system of claim 9, wherein the instructions cause the system to:
  store the segment and the assigned key in memory; and
  sync the segment in memory to the storage medium based on an event.

16. The system of claim 9, wherein the offset indicates a relative placement of the segment with respect to the plurality of segments in the database.

* * * * *